United States Patent
Blanc et al.

(10) Patent No.: US 8,090,475 B2
(45) Date of Patent: Jan. 3, 2012

(54) METHOD AND DEVICE FOR MONITORING THE CONDITION OF AN INDUSTRIAL ROBOT

(75) Inventors: Dominique Blanc, Västerås (SE); Niclas Sjöstrand, Västerås (SE)

(73) Assignee: ABB Research Ltd., Zürich (CH)

(*) Notice: Subject to any disclaimer, the term of this patent is extended or adjusted under 35 U.S.C. 154(b) by 1068 days.

(21) Appl. No.: 11/987,522

(22) Filed: Nov. 30, 2007

(65) Prior Publication Data

US 2008/0191654 A1 Aug. 14, 2008

(30) Foreign Application Priority Data

Nov. 30, 2006 (EP) .................................. 06125079

(51) Int. Cl.
*G05B 15/00* (2006.01)
(52) U.S. Cl. .................. 700/261; 901/2; 901/3; 901/4; 901/5; 901/9
(58) Field of Classification Search .................. 700/261; 701/87; 702/41
See application file for complete search history.

(56) References Cited

U.S. PATENT DOCUMENTS 4,925,312 A * 5/1990 Onaga et al. .................. 700/261

FOREIGN PATENT DOCUMENTS

| JP | 62024305 | A |   | 2/1987 |
|----|----------|---|---|--------|
| JP | 62024305 | A | * | 2/1987 |
| JP | 02218588 | A |   | 8/1990 |
| JP | 03222692 | A |   | 10/1991 |
| JP | 2004181543 | A |   | 7/2004 |

OTHER PUBLICATIONS

Machine translation of JP 62024305 A.*
European Search Report—Sep. 3, 2007.

* cited by examiner

*Primary Examiner* — Thomas Black
*Assistant Examiner* — Luke Huynh
(74) *Attorney, Agent, or Firm* — Venable LLP; Eric J. Franklin

(57) ABSTRACT

A method for monitoring the condition of an industrial robot having a plurality of links movable relative to each other, and a plurality of actuators controlling the movements of the links. A feed forward torque is calculated for at least one of the actuators based on reference values for the position of the actuator and a mathematical model of the robot calculating a feedback torque for the actuators based on measured values from the actuators and reference values for the position of the actuator. A torque is calculated for the actuator at least based on the feedback torque. A difference is monitored between the calculated torque for the actuator and the feed forward torque. It is determined whether the difference is normal or non-normal, and based thereon monitoring the condition of the robot.

12 Claims, 5 Drawing Sheets

METHOD AND DEVICE FOR MONITORING THE CONDITION OF AN INDUSTRIAL ROBOT

TECHNICAL FIELD

The present invention is concerned with monitoring the condition of an industrial robot. The invention is particularly useful for monitoring malfunction of the robot.

BACKGROUND ART

An industrial robot comprises a manipulator and a control system. The manipulator comprises links movable relative to each other. The links are different robot parts such as a base, arms, and a wrist. Each joint has joint components such as a motor, motor gears and motor bearings. Actuators, such as motors, drive the movements of the manipulator. The control system comprises one or more computers and drive units for controlling the manipulator. The position and speed of the links are controlled by the control system of the robot that generates control signals to the motors. The control system includes a path planner adapted to calculate reference values for the position of the actuators. The drive units are adapted to calculate reference values for the torques of the actuators. The drive unit is provided with a feedback loop calculating a feedback torque for the actuator based on measured position values from the actuator and the position reference values from the path planner. The drive units are adapted to calculate the reference values for the torques of the actuators based on the feedback torque from the feedback loop. In order to improve the control of the actuators, some drive units are further provided with a feed forward loop calculating a feed forward torque for the actuator based on the position reference values from the path planner and a mathematical model of the robot. In those cases, the control units are adapted to calculate the reference values for the torques of the actuators based on the feedback torque from the feedback loop as well as on the feed forward torque from the feed forward loop.

Industrial robots are used in industrial and commercial applications to perform precise and repetitive movements. It is then important for a faultless functionality of the robot that the industrial robot is performing according to its nominal performance, which means that the links have to be in good condition and perform together in an expected way.

However, it is difficult to detect or determine if an industrial robot is not performing according to its nominal performance. The operator, such as a service technician, has to rely on what he sees and on information from the control system about the performance of the robot, such as the position and speed of the motors taken from readings on sensors on the manipulator. The operator then analyses the present condition of the robot based on his personal experience resulting in a varying diagnosis due to subjective measures. In many cases the operator analysing the present condition and performance of the robot also needs to evaluate information from different sources, such as different motors at the same time or external conditions in the facility where the robot is located or is even faced with an emergency stop. To find the cause of a failure the operator may have to try different hypotheses and it is therefore time consuming and often results in long stand-still periods for the robot causing huge costs.

Due to frequent personal rotation today, operators of robot service technician staff do not have sufficient experience to diagnose and isolate a failure in performance of the robot.

It is desirable to attain a simple method to diagnostic the present performance or condition of the robot.

JP62024305 discloses a method for detecting servo abnormality of an industrial robot. The method includes monitoring the deviation between the reference value of the position of an actuator of a drive source and present values of the position of the actuator and based thereon detect servo abnormality. This method supervises the control error, i.e. the difference between the reference position and the measured value of the position in order to detect abnormalities. A disadvantage with this method is that the control error has large natural variations, for example due to changes in the position reference values, which are not caused by an error in the robot performance. Abnormalities due to wear of the drive components, such as the motors, motor gears, motor bearings and axes, and brakes, causes small and slow changes in the control error. Accordingly, it is difficult to detect changes in the control error due to wear in the drive components.

SUMMARY OF THE INVENTION

The aim of the invention is to provide an improved method to automatically monitor the condition of an industrial robot.

Such a method comprises: calculating a feed forward torque for at least one of the actuators based on reference values for the position and/or for the velocity of the actuator, and a mathematical model of the robot, calculating a feedback torque for the actuators based on measured values from the actuators and said reference values for the position of the actuator, calculating a reference value for the torque of the actuator based on said feed forward torque and said feedback torque, monitoring the difference between the reference value for the torque of the actuator and the feed forward torque, determining whether the difference is normal or non-normal, and based thereon monitoring the condition of the robot.

The calculated feed forward torque is an expected torque due to dynamic and/or kinematic forces on robot parts, such as forces on the arms of the robot due to gravity and inertia. According to the invention, the difference between the reference values for the torque of the actuator and the feed forward torque from the feed forward loop is monitored in order to detect non-normal changes due to malfunction of the robot. For example, it is possible to detect deviation trends in amplitude distribution and/or detect deviation trends in frequency distribution and thereby recognize mechanical problems. By subtracting the feed forward torque from the reference torque, normal variations in the reference torque, for example, due to known dynamic and kinematic behaviours of the robot, are reduced. Thereby, the sensitivity for detecting non-normal changes is considerably increased and accordingly the monitoring of the robot is enhanced.

According to an embodiment of the invention, the calculated feedback torque, which is the same as the difference between the reference value for the torque and the feed forward torque, is monitored and it is determined whether the feedback torque is normal or non-normal.

According to an embodiment of the invention, the difference between the reference value for the torque of the actuator and the feed forward torque is calculated by subtracting a calculated feed forward torque from the calculated reference value for the torque. The calculated difference is monitored. It is not required to use the same feed forward torque for controlling the actuators as for monitoring the condition of the robot. On the contrary, it can be an advantage to use a more complete model for monitoring the robot than for controlling it. For example, it is possible to calculate two different feed forward torques; a first feed forward torque, calculated based on a first model of the robot, which is used for calculating the reference values, and a second feed forward torque, which is calculated based on a different model of the robot, which is used for monitoring the robot. For example, the first calculated feed forward torque is calculated based on a model of the robot, which does not consider all weaknesses of the robot arms, and the second feed forward torque is calculated based on a model of the robot, which does consider torques due to gravity forces on the robot arms.

In another embodiment of the invention, said monitored condition of the robot is wear of the driving components. The driving components comprise at least the mechanical units: motors, motor gears, bearings, axes, and brakes. This makes it possible to detect wear of the motors, motor gears, motor bearings and axes, and brakes. Further by determining wear of the driving component the need for service may be predicted.

In another embodiment of the invention a deviation parameter is calculated based on the difference between the reference value for the torque and the feed forward torque, which parameter is a measure of the condition of the performance of the robot. This is an advantage because it makes it possible to monitor the parameter and react on changes in the parameter.

Other advantageous features and advantages of the invention will appear from the following description.

BRIEF DESCRIPTION OF THE DRAWINGS

The present invention will be described in more detail in connection with the enclosed schematic drawings.

DESCRIPTION OF THE PREFERRED EMBODIMENTS

Figure 1:
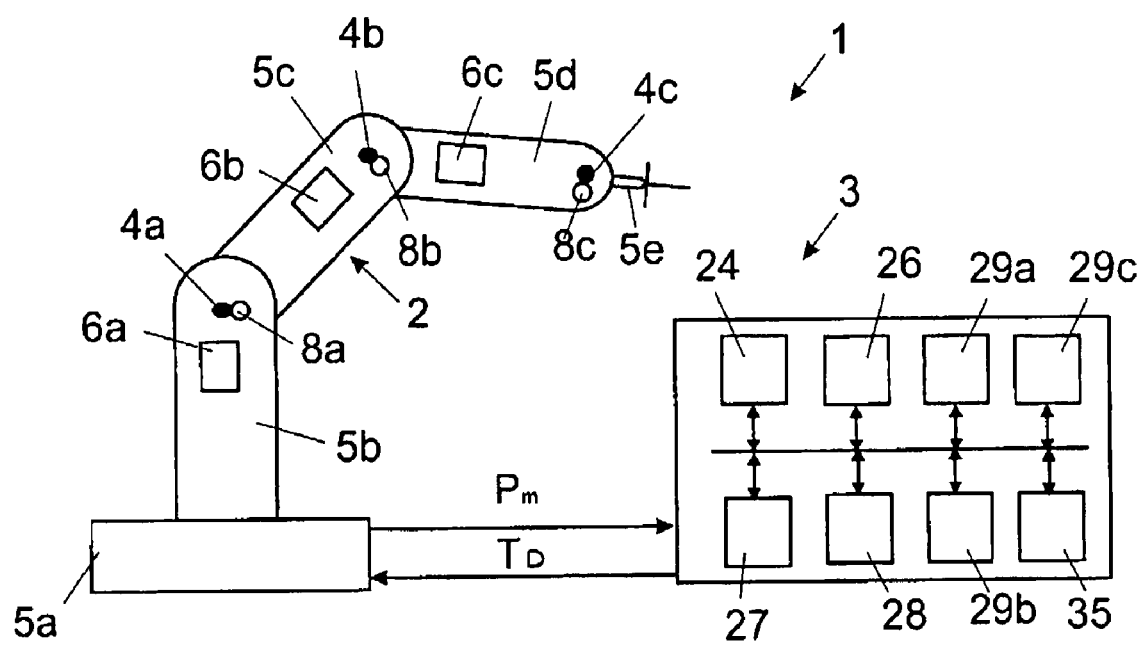
FIG. 1 shows an industrial robot comprising a manipulator and a control system according to an embodiment of the invention.

FIG. 1 shows an industrial robot 1 comprising a manipulator 2 and control system 3. The industrial robot 1 has a plurality of links movable relative to each other about a plurality of joints 4a-c. The links shown in FIG. 1 are rotatable in relation to each other around an axis of rotation. Other types of robots have links that are linearly movable relative each other. The links are in this case robot parts, such as a stand 5a, robot arms 5b-d, and a tool holder 5e. The industrial robot comprises a plurality actuators 6a-c for controlling the position and speed of the links. Each actuator is connected to a drive unit 29a-c for generating control signals to the motor. In this embodiment the drive units are located in the control system. However, it is also possible to locate the drive units on the manipulator, close to the actuator. The actuator comprises driving components such as, for instance, motors, motor gears, bearings, axes, brakes.

Each joint of the manipulator is provided with a sensor 8a-c detecting the position of the joint. Signals from the sensors 8a-c are transmitted to the control system 3. The control system 3 thereby receives signals comprising measured data $P_m$. The measured data comprises, for instance, joint angular position, joint velocity, and joint acceleration.

The control system 3 comprises, in this case, a logic unit 24, and a memory means 26 for storing control programs including movement instructions for the robot, a program executer 27 for executing the movement instructions, a path planner 28 for planning robot paths, and drive units 29a-c for generating torque reference signals $T_D$ to the motors. The path planner 28 is planning the robot paths and further generating joint reference values to the drive unit 29a-c. The joint reference values, for example, represent reference values for positions and velocities of the joints. The path planner 28 generates the joint reference values based on movement instructions from the robot program and a mathematical model of the robot. During operation of the robot, the program instructions are executed, thereby making the robot work as desired. The drive units 29a-c are controlling the motors by controlling the motor torque and the motor position in response to the joint reference values from the path planner 28. The logic unit or computing unit comprises a microprocessor, or processors comprising a central processing unit (CPU) or a field-programmable gate array (FPGA) or any a semiconductor device containing programmable logic components and programmable interconnects for performing the steps in a computer program. The control system 3 further comprises a monitoring device 35 according to an embodiment of the invention.

Figure 2A:
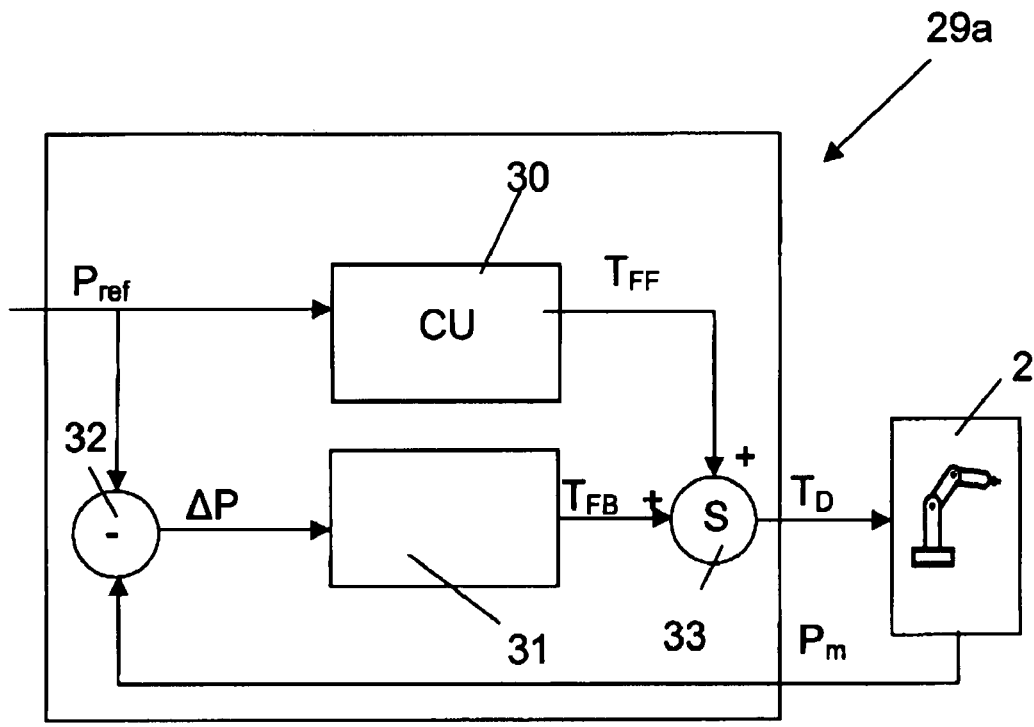
FIGS. 2a-b show block diagrams illustrating examples of control loops for controlling an actuator of the robot.

FIG. 2a shows an example of one of the drive units 29a described above. The drive unit 29a receives joint reference values $P_{ref}$ from the path planner 28 of the robot and measured values $P_m$ for joint positions and/or joint velocities from the sensors. The drive unit 29a is configured to calculate reference values for the torque $T_D$ of the actuator. The drive unit comprises a feed forward loop including a calculation unit 30 configured to calculate a feed forward torque $T_{FF}$ for the actuator based on join reference values $P_{ref}$ from the path planner and a mathematical model of the robot, and a feedback loop including a feedback controller 31, configured to calculate a feedback torque $T_{FB}$ for the actuator based on measured values $P_m$ from the actuator and joint reference values $P_{ref}$ from the path planner. Typically, the mathematical model is a kinematic and dynamic model describing the robot.

The drive unit 29a further includes a first summing means 32 configured to continuously calculate the deviation $\Delta P$ between the measured joint values $P_m$ and the joint reference values $P_{ref}$. The calculated deviation $\Delta P$ is fed to the feedback controller 31. The drive unit 29a further includes a second summing means 33 configured to continuously calculate the reference torque $T_D$ for the actuator as the sum of the feed forward torque $T_{FF}$ and the feedback torque $T_{FB}$ for the actuator.

$$T_D = T_{FF} + T_{FB}$$

Accordingly, the difference $T_{diff}$ between the calculated reference torque $T_D$ and the calculated feed forward torque $T_{FF}$ is the output $T_{FB}$ from the feedback controller.

$$T_{diff} = T_D - T_{FF} = T_{FB}$$

In this embodiment, the feedback torque $T_{FB}$ is used for monitoring the condition of the robot.

Figure 2B:
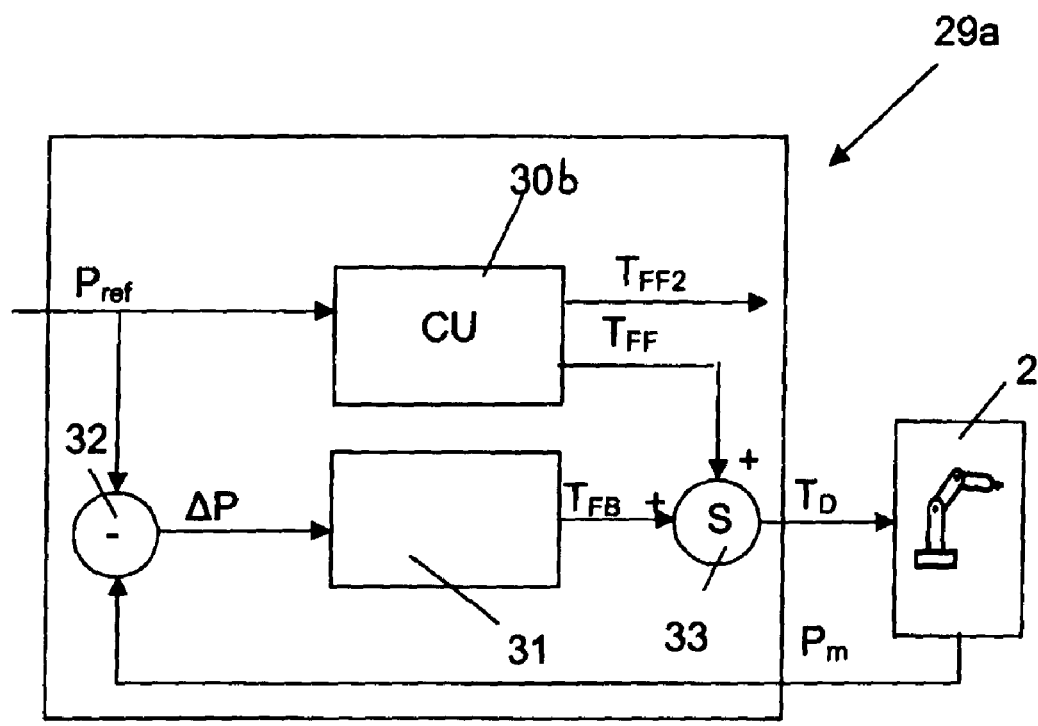

FIG. 2b illustrates another embodiment of the invention. The calculation unit 30b is configured to calculate a second feed forward torque $T_{FF2}$ based on another mathematical model of the robot, which more completely describes the kinematic and dynamic behaviour of the robot and the position reference values $P_{ref}$ from the path planner. The difference $T_{diff}$ between the reference value for the torque and the feed forward torque is calculated by subtracting the second feed forward torque $T_{FF2}$ from the torque reference values $T_D$.

$$T_{diff}=T_D-T_{FF2}$$

In this embodiment, the difference between the reference value $T_D$ and the second feed forward torque $T_{FF2}$ is used for monitoring the condition of the robot.

Figure 3:
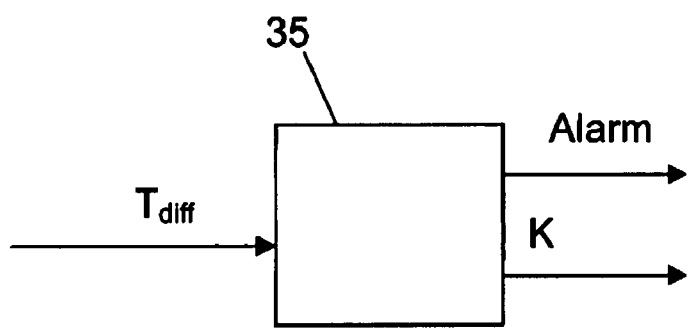
FIG. 3 shows a block diagram illustrating a device for monitoring malfunction of an industrial robot according to an embodiment of the invention.

FIG. 3 shows a block diagram illustrating a monitoring device 35 for monitoring malfunction of an industrial robot. The monitoring device according to the invention is configured to monitor the difference $T_{diff}$ between the reference value for the torque $T_D$ of the actuator and the feed forward torque $T_{FF}$, $T_{FD}$ and to determine whether the difference is normal or non-normal, and to monitor the condition of the robot based thereon. According to one embodiment of the invention, the output $T_{FB}$ from the feedback controller is monitored. According to another embodiment of the invention, the difference between the reference value for the torque $T_D$ of the actuator and the feed forward torque $T_{FF2}$ is calculated by subtracting the output $T_{FF2}$ from calculation means 30 from the output $T_D$ from the summing means 33.

The monitoring device 35 is implemented in the control system 3 as software, hardware, or a combination thereof. The monitoring device 35 monitors the condition of the robot based on whether the difference between the reference value and the feed forward torque is normal or non-normal. A deviation parameter K is calculated in the monitoring device 35 dependent on the difference between the reference value for the torque $T_D$ of the actuator and the feed forward torque $T_{FF}$. The deviation parameter K is for instance calculated by normalizing the difference, or by calculating a logarithm of the difference or by processing the difference using any other mathematical method. The monitoring device 35 determines whether the difference is normal or non-normal. This is for instance done by comparing the deviation parameter K with a preset reference constant value V representing a maximum allowed value of the deviation parameter. Another method to determining whether the deviation is normal or non-normal is to detect deviation trends in amplitude distribution and/or detect deviation trends in frequency distribution of the deviation parameters K during a period of time. Detecting deviation trends may also be done by calculating a differential quotient value between two or more deviation parameters subsequent in time and compare these to a reference differential quotient value. The deviation parameter K, for instance, is monitored shown on a display in order for the operator to manually control the condition of the robot. The monitoring device 35 is adapted to monitor the deviation parameter, or the change in the deviation parameter K during a time period. The monitoring device 35 is in this case located in the control system.

The monitoring device 35 is in this case adapted to execute an order to the control systems based on the monitored deviation. An example on an order is executing an alarm if the deviation is determined to be non-normal, for instance, when the deviation exceeds a maximum value.

The monitoring device 35 may also be located on an external computer. The monitoring device may also be adapted for manual control such as transfer of the deviation parameter K, or the change in the deviation parameter K during a time period to an external interface, such a display or other manual control means such as light emitting diodes.

The monitored condition of the robot is for instance wear of the driving components. The detected condition may be slipping in the gears, a greater motor speed/acceleration or a greater load then expected.

In an embodiment, the monitoring device is adapted to both analyse the deviation and to generate an alarm if the difference between the reference value for the torque $T_D$ of the actuator and the feed forward torque $T_{FF}$ is non-normal. For instance, the difference, or the deviation parameter K is compared with a maximum value and an alarm is executed when the difference, or the deviation parameter K exceeds the maximum value.

In the following, a method for monitoring the condition of an industrial robot according to the invention will be described. The method is for clarity described for one joint controlled by one actuator but it is to be understood that the same technique may be used controlling two or more joints of the robot at the same time.

Figure 4:
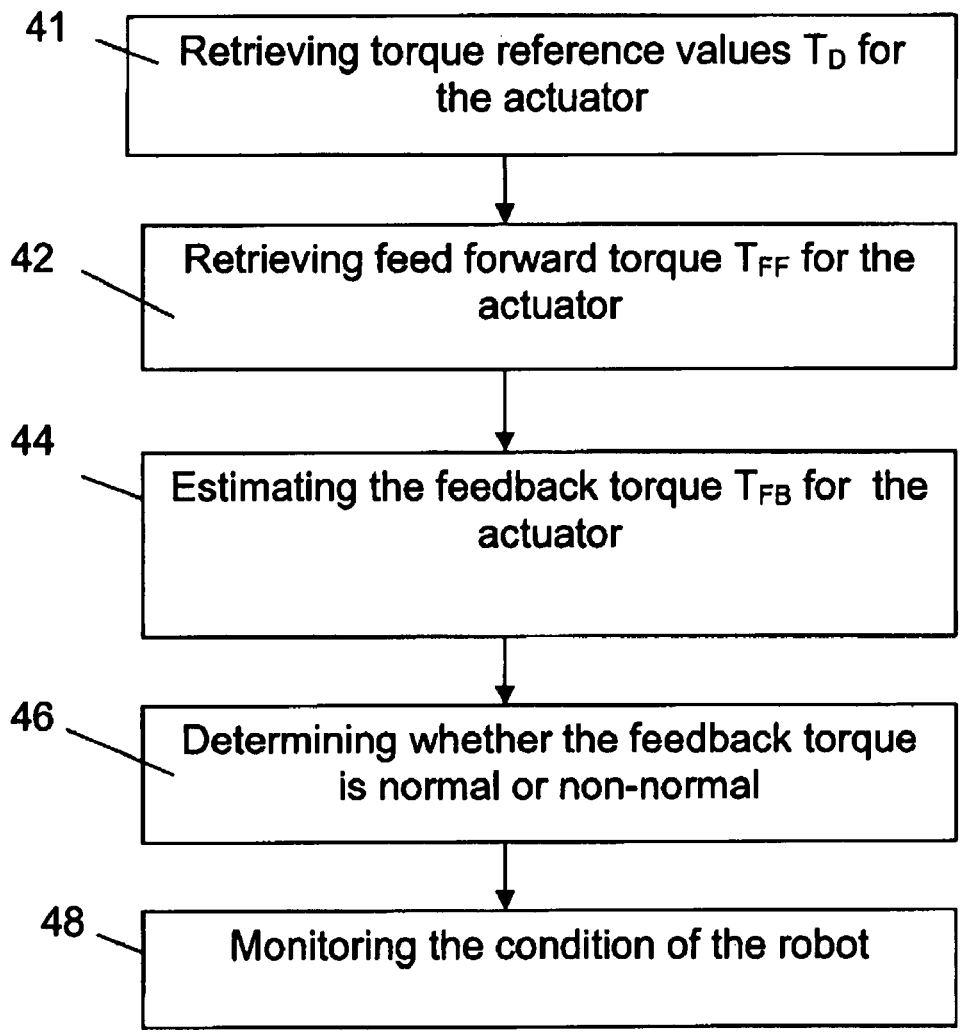
FIG. 4 shows a flow chart illustrating a method for monitoring malfunction of an industrial robot according to an embodiment of the invention.

FIG. 4 shows a flow chart illustrating the method for monitoring the condition of an industrial robot according to an embodiment of the invention. The method according to the present invention may be implemented as software, hardware, or a combination thereof. The method comprises the following steps:

Reference values $T_D$ for the actuator are continuously retrieved from the summing means 32, block 41. Feed forward torques $T_{FF}$ are continuously retrieved from the calculation means 30, block 42. The differences between the reference values for the torques $T_D$ and the feed forward torques $T_{FF}$ are continuously calculated, block 44. Thus, the differences between the reference values for the torque $T_D$ of the actuator and the feed forward torques $T_{FF}$ are continuously monitored. The differences between the torque reference values and the feed forward torques are then analyzed, and it is determined whether the difference is normal or non-normal, block 46. Based on the analysis of whether the differences between the reference values for the torque $T_D$ and the feed forward torques $T_{FF}$ is normal or non-normal, the condition of the robot (48) is monitored, block 48, for instance, shown on an external display or in the control system.

The difference between the reference value for the torque $T_D$ of the actuator and the feed forward torque $T_{FF}$ is in one embodiment further processed and a deviation parameter K is calculated dependent on the calculated difference. The deviation parameter K, for instance, is calculated by normalizing the difference or by calculating a logarithm of the difference. The deviation parameter K is, for instance, analyzed by comparing the deviation parameter K with a preset reference constant value V representing a maximum allowed value of the deviation parameter. The deviation parameter may also be analysed by detecting deviation trends in amplitude distribution and/or deviation trends in frequency distribution on the deviation parameter K during a period of time. A large deviation indicates a change in the values representing the mechanical properties of the robot.

These steps can be carried out in the control system of the robot or in an external computer. The differences between the reference values for the torque $T_D$ of the actuator and the feed forward torques $T_{FF}$ are continuously calculated and monitored so that the condition of an industrial robot is continuously monitored.

Further based on the monitored condition the control system can be adapted to execute orders to the control system, such as executing an alarm when the deviation is determined to be non-normal. Due to limited computer capacity of the control system it is advantageous to transfer the difference or the deviation parameter K to an external computer executing the methods according to the invention.

Figure 5:
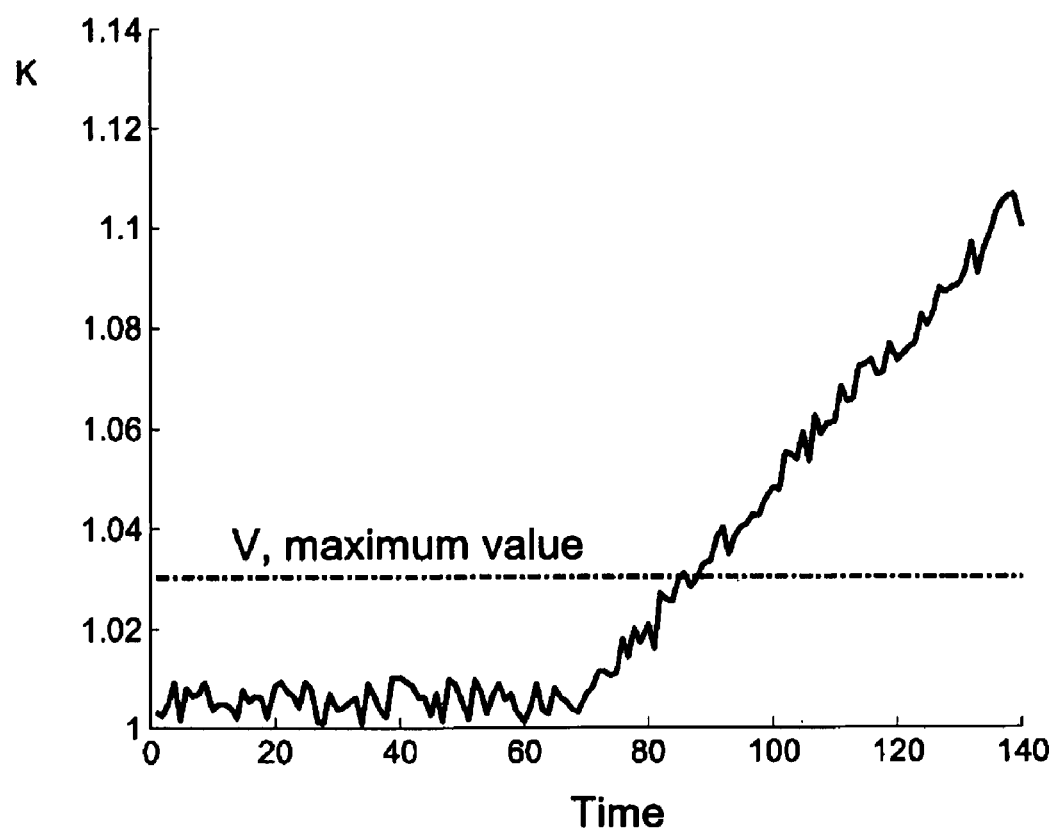
FIG. 5 shows an example diagram viewing how a deviation parameter may vary over time.

FIG. 5 shows an example diagram viewing how the deviation parameter may vary over time. A maximum value V for the deviation parameter is set in the diagram. This figure shows the robot performance when the robot performance is non-normal, and the deviation exceeds the preset maximum value.

The invention claimed is:

1. A method for monitoring a condition of an industrial robot comprising a plurality of links movable relative to each other, and a plurality of actuators controlling movements of the links, the method comprising:
   calculating a feed forward torque for at least one of the actuators based on reference values for a position of the actuator and a mathematical model of the robot,
   calculating a feedback torque for the actuators based on measured values from the actuators and said reference values for the position of the actuator,
   calculating a reference value for a torque of the actuator at least based on said feedback torque,
   monitoring a difference between the reference value for the torque of the actuator and the feed forward torque, and
   determining whether the difference is normal or non-normal, and based thereon monitoring the condition of the robot.

2. The method according to claim 1, further comprising:
   calculating a difference between the reference value for the torque of the actuator and the calculated feed forward torque, and
   monitoring the calculated difference.

3. The method according to claim 1, further comprising:
   monitoring the calculated the feedback torque and
   determining whether the feedback torque is normal or non-normal.

4. The method according to claim 1, wherein said monitored condition of the robot comprises wear of driving components of the robot.

5. The method according to claim 4, wherein said driving components comprises any of: motors, motor gears, bearings, axes, and brakes.

6. The method according to claim 1, further comprising:
   generating an alarm when said difference exceeds a maximum value.

7. The method according to claim 1, further comprising:
   calculating a deviation parameter based on the difference between the reference value for the torque of the actuator and the feed forward torque, the deviation parameter being a measure of the condition of the performance of the robot.

8. A device for monitoring a condition of an industrial robot, said robot comprising a plurality of links movable relative to each other, actuators controlling movements of the links, a path planner adapted to calculate reference values for a position of the actuators, and at least one drive unit calculating reference values for the torque of the actuators, the drive unit having a feed forward loop calculating a feed forward torque for the actuator based on said reference values for the position of the actuator and a mathematical model of the robot, and a feedback loop calculating a feedback torque for the actuator based on measured values from the actuator and said reference values for the position of the actuator, wherein the device is configured to monitor the difference between the reference value for the torque of the actuator and the feed forward torque, to determine whether said difference is normal or non-normal, and to monitor the condition of the robot based thereon.

9. The device according to claim 8, wherein the device is configured to calculate the difference between the reference value for the torque of the actuator and the feed forward torque, and to monitor the calculated difference.

10. The device according to claim 8, wherein the device is configured to monitor the calculated the feedback torque and to determine whether the feedback torque is normal or non-normal.

11. The device according to claim 8, wherein said device is adapted to generate an alarm if said difference is non-normal.

12. The device according to claim 8, wherein said device is adapted to calculate a deviation parameter based on the difference between the reference value for the torque of the actuator and the feed forward torque, which parameter is a measure of the condition of the performance of the robot.

* * * * *